US012601999B2

(12) United States Patent
Watanabe et al.

(10) Patent No.: US 12,601,999 B2
(45) Date of Patent: Apr. 14, 2026

(54) IMAGE FORMATION ADJUSTMENT METHOD AND IMAGE FORMING APPARATUS

(71) Applicant: KYOCERA Document Solutions Inc., Osaka (JP)

(72) Inventors: Masaru Watanabe, Osaka (JP); Makoto Matsumoto, Osaka (JP); Yasuaki Sakamoto, Osaka (JP); Ayato Morikami, Osaka (JP); Yukiko Kotani, Osaka (JP); Atsuki Ito, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/046,333

(22) Filed: Feb. 5, 2025

(65) Prior Publication Data

US 2025/0251685 A1 Aug. 7, 2025

(30) Foreign Application Priority Data

Feb. 5, 2024 (JP) ................................ 2024-015453

(51) Int. Cl.
*G03G 15/00* (2006.01)
*G03G 15/01* (2006.01)

(52) U.S. Cl.
CPC ..... *G03G 15/5058* (2013.01); *G03G 15/0121* (2013.01); *G03G 15/0189* (2013.01); *G03G 15/556* (2013.01)

(58) Field of Classification Search
CPC ........... G03G 15/5058; G03G 15/0121; G03G 15/0189; G03G 15/556
See application file for complete search history.

(56) References Cited

U.S. PATENT DOCUMENTS

| | | | | |
|---|---|---|---|---|
| 2011/0280599 | A1 | 11/2011 | Ino et al. | |
| 2012/0288297 | A1 * | 11/2012 | Sugeta | G03G 15/5058 399/72 |
| 2016/0147175 | A1 * | 5/2016 | Ohkubo | G03G 15/0189 399/301 |
| 2017/0235266 | A1 * | 8/2017 | Ino | G03G 15/5058 399/301 |

FOREIGN PATENT DOCUMENTS

JP 2012003242 A 1/2012

* cited by examiner

*Primary Examiner* — Sandra Brase
(74) *Attorney, Agent, or Firm* — Alleman Hall LLP

(57) ABSTRACT

A control device selects one of a plurality of chromatic colors as a target chromatic color according to a consumption status of developing agents of the plurality of chromatic colors. The control device causes an image forming portion to execute a process of forming, on a surface of a transfer medium, a plurality of chromatic color test images of the plurality of chromatic colors, and a superimposed test image in which a black test image is superimposed on a background image of the target chromatic color. The control device acquires a test detection signal of an amount of diffuse reflection light in each of areas of the plurality of chromatic color test images and the superimposed test image on the surface of the transfer medium. The control device adjusts timing of image formation of the plurality of colors by the image forming portion based on the test detection signal.

5 Claims, 6 Drawing Sheets

IMAGE FORMATION ADJUSTMENT METHOD AND IMAGE FORMING APPARATUS

INCORPORATION BY REFERENCE

This application is based upon and claims the benefit of priority from the corresponding Japanese Patent Application No. 2024-015453 filed on Feb. 5, 2024, the entire contents of which are incorporated herein by reference.

BACKGROUND

The present disclosure relates to an image formation adjustment method for adjusting timing for forming images of a plurality of development colors, and relates to an image forming apparatus.

An electrophotographic image forming apparatus forms a color image by forming images of a plurality of development colors, including black and a plurality of chromatic colors, on a transfer medium. The image forming apparatus may include a diffuse reflection light detection portion that irradiates a surface of the transfer medium with light and detects an amount of diffuse reflection light reflected by the surface of the transfer medium.

It is known that the image forming apparatus performs color slippage adjustment in accordance with detection results by the diffuse reflection light detection portion for a plurality of test images. The color slippage adjustment is an adjustment of timing of image formation of a plurality of colors. The plurality of test images are images formed using developing agent of the plurality of development colors.

SUMMARY

An image formation adjustment method according to one aspect of the present disclosure is a method for adjusting an image forming apparatus including a developing agent supply portion, an image forming portion, and a diffuse reflection light detection portion. The developing agent supply portion supplies black developing agent and developing agents for a plurality of chromatic colors. The image forming portion forms an image of the black developing agent and developing agents for a plurality of chromatic colors supplied from the developing agent supply portion on a surface of a transfer medium. The diffuse reflection light detection portion irradiates the surface of the transfer medium with light and detects an amount of diffuse reflection light reflected by the surface of the transfer medium. The image formation adjustment method includes a control device selecting one of the plurality of chromatic colors as a target chromatic color according to a consumption status of developing agents of the plurality of chromatic colors. The image formation adjustment method further includes the control device causing the image forming portion to execute a process of forming, on the surface of the transfer medium, a plurality of chromatic color test images that are images of the plurality of chromatic colors, and a superimposed test image in which a black test image is superimposed on a background image of the target chromatic color. The image formation adjustment method further includes the control device acquiring from the diffuse reflection light detection portion a test detection signal that is a detection signal of an amount of diffuse reflection light in each of areas of the plurality of chromatic color test images and the superimposed test image on the surface of the transfer medium. The image formation adjustment method further includes the control device adjusting timing of image formation of the plurality of colors by the image forming portion based on the test detection signal.

An image forming apparatus according to another aspect of the present disclosure includes the developing agent supply portion, the image forming portion, the diffuse reflection light detection portion, and the control device that achieves the image formation adjustment method.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments according to the present disclosure will be described with reference to the drawings. Note that the following embodiments are examples of a technique according to the present disclosure and do not limit the technical scope according to the present disclosure.

An image forming apparatus 10 according to an embodiment executes a printing process by electrophotography. The printing process is a process for forming an image on a sheet 9. The sheet 9 is a sheet-like image forming medium such as paper or a resin film. For example, the image forming apparatus 10 may be a printer, a facsimile apparatus, a copier, a multifunction peripheral, or the like.

[Configuration of Image Forming Apparatus 10]

Figure 1:
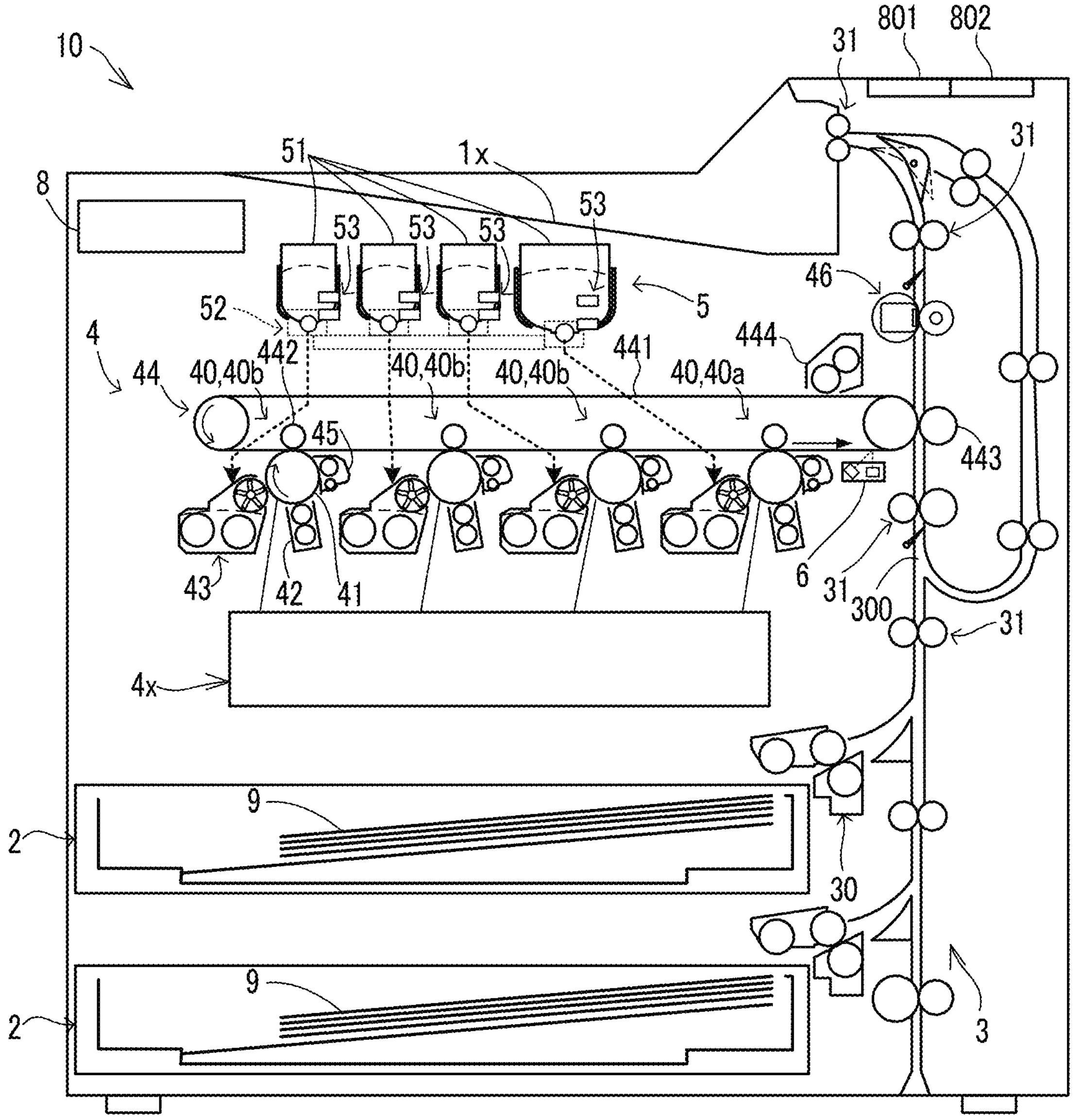
FIG. 1 is a diagram showing a configuration of an image forming apparatus according to an embodiment.

As shown in FIG. 1, an image forming apparatus 10 includes a sheet conveying device 3, an image forming portion 4, a toner supply portion 5, and a control device 8. The image forming apparatus 10 further includes an operation device 801 and a display device 802.

The sheet conveying device 3 includes a sheet feeding mechanism 30 and a plurality of sets of conveying roller pairs 31. The sheet feeding mechanism 30 feeds out a sheet 9 stored in a sheet storing portion 2 to a conveying path 300. The conveying path 300 is a path along which the sheet 9 is conveyed.

The plurality of sets of conveying roller pairs 31 are rotationally driven by a motor (not shown). The plurality of sets of conveying roller pairs 31 rotate to convey the sheet 9 along the conveying path 300, and then discharge the sheet 9 onto a discharge tray 1*x*.

The toner supply portion 5 supplies toners for a plurality of colors to the image forming portion 4. The toner is an example of a powder developing agent. The toner supply portion 5 is an example of a developing agent supply portion. The plurality of development colors include black and a plurality of chromatic colors. In the present embodiment, the plurality of chromatic colors are three colors: yellow, cyan, and magenta.

The toner supply portion 5 includes a plurality of toner storage units 51 and a toner feeding mechanism 52. The plurality of toner storage units 51 respectively store the toners of the plurality of development colors. The toner feeding mechanism 52 feeds the toner from each of the plurality of toner storage units 51 to the image forming portion 4.

The toner supply portion 5 further includes a remaining amount detection portion 53. The remaining amount detection portion 53 detects a remaining amount of toner of each color in the plurality of toner storage units 51.

The image forming portion 4 forms an image by electrophotography. In the example shown in FIG. 1, the image forming apparatus 10 is a tandem type color image forming apparatus.

The image forming portion 4 includes a plurality of image forming units 40 corresponding to the plurality of development colors. The image forming portion 4 further includes a laser scanning unit 4*x*, a transfer device 44, and a fixing device 46.

Each of the image forming units 40 includes a drum-shaped photoconductor 41, a charging device 42, a developing device 43, a drum cleaning device 45, and the like. That is, the image forming portion 4 includes a plurality of photoconductors 41 corresponding to the plurality of development colors, a plurality of developing devices 43, and a plurality of drum cleaning devices 45.

In each of the image forming units 40, the photoconductor 41 rotates, and the charging device 42 charges a surface of the photoconductor 41. The laser scanning unit 4*x* scans the surfaces of each of the charged photoconductors 41 with a plurality of laser beams. Thus, the laser scanning unit 4*x* forms an electrostatic latent image on the surface of each of the multiple photoconductors 41.

Each of the laser beams is an example of a beam of light that is scanned over the surface of the photoconductor 41.

In each of the image forming units 40, the developing device 43 supplies the toner to the surface of the photoconductor 41, thereby developing the electrostatic latent image into a toner image. The toner supply portion 5 supplies the toners of the plurality of development colors to the developing devices 43 of the plurality of image forming units 40, respectively. The photoconductor 41 is an example of an image-carrying member that rotates while carrying the toner image.

In the present embodiment, the image forming portion 4 includes four image forming units 40 corresponding to the toners of black and three chromatic colors. Therefore, the image forming portion 4 includes four photoconductors 41, four developing devices 43 and four drum cleaning devices 45.

The four toner images are formed on the surfaces of the four photoconductors 41. The transfer device 44 transfers the four toner images from the four photoconductors 41 to the sheet 9.

The transfer device 44 includes an intermediate transfer belt 441, four primary transfer devices 442 corresponding to the four image forming units 40, a secondary transfer device 443, and a belt cleaning device 444.

The four primary transfer devices 442 transfer the toner images on the surfaces of the four photoconductors 41 onto the surface of the intermediate transfer belt 441. Thus, the image forming portion 4 forms an image of the black toner and the plurality of chromatic color toners supplied from the toner supply portion 5 on the surface of the intermediate transfer belt 441. The intermediate transfer belt 441 is an example of a transfer medium onto which the toner image is transferred.

When the printing process is executed, the image forming portion 4 can form a color toner image, which is a composite of the toner images of the four photoconductors 41, on the surface of the intermediate transfer belt 441.

The secondary transfer device 443 transfers the toner image formed on the intermediate transfer belt 441 onto the sheet 9 at a transfer position on the conveying path 300.

The fixing device 46 applies heat and pressure to the toner image transferred onto the sheet 9. As a result, the fixing device 46 fixes the toner image onto the sheet 9.

Each drum cleaning device 45 removes toner remaining on the surface of each photoconductor 41. The belt cleaning device 444 removes toner remaining on the intermediate transfer belt 441.

The operation device 801 receives operations by a person. For example, the operation device 801 includes one or both of a touch panel and one or more operation buttons. The display device 802 is capable of displaying various types of information. For example, the display device 802 is a panel display device such as a liquid-crystal panel unit.

[Control Device 8]

The control device 8 executes various types of data processing and controls devices included in the image forming apparatus 10.

Figure 2:
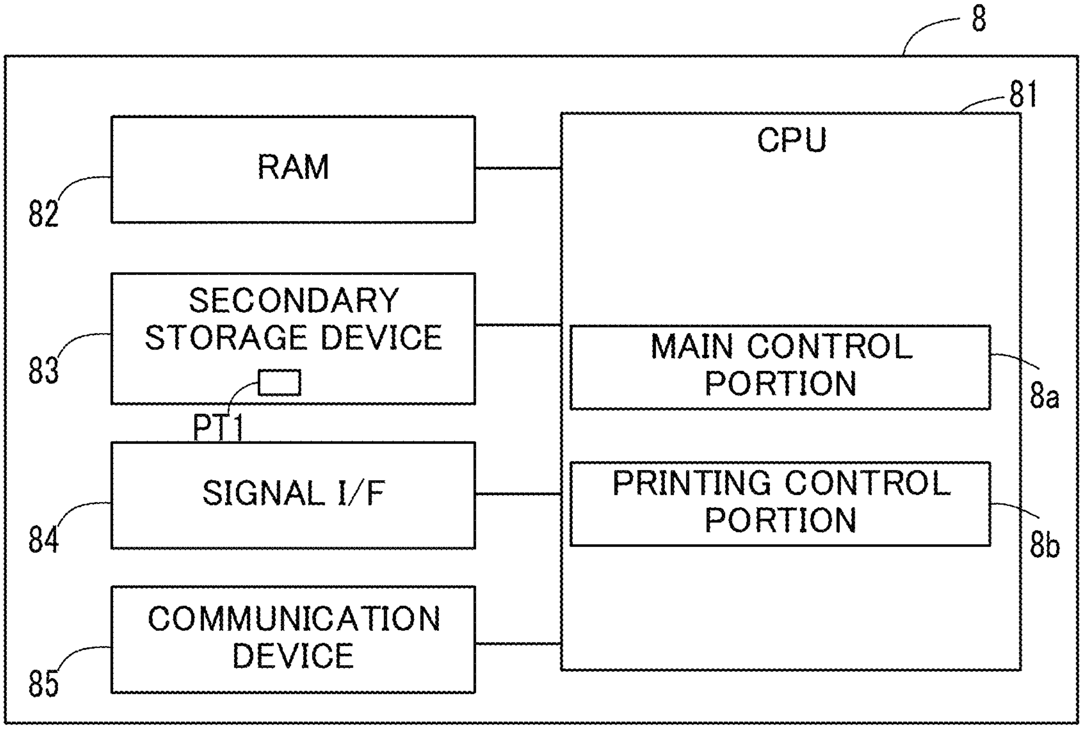
FIG. 2 is a block diagram showing a configuration of a control device in an image forming apparatus according to an embodiment.

As shown in FIG. 2, the control device 8 includes a central processing unit (CPU) 81, and peripheral devices such as a random access memory (RAM) 82, a secondary storage device 83, and a signal interface 84. The control device 8 further includes a communication device 85.

The CPU 81 is a processor that executes various types of data processing and control by executing computer programs. The CPU 81 is an example of a processor that controls the image forming apparatus 10.

The RAM 82 is a computer-readable volatile storage device. The RAM 82 temporarily stores the computer programs executed by the CPU 81 and data output and referenced by the CPU 81 in the course of executing various types of processes.

The secondary storage device 83 is a non-volatile storage device readable by a computer. The secondary storage device 83 is capable of storing and updating the computer programs and various types of data. For example, a flash memory or a hard disk drive, or both, may be employed as the secondary storage device 83.

The signal interface 84 converts signals output by various types of sensors into digital data, and transmits the converted digital data to the CPU 81. Furthermore, the signal interface 84 converts a control command output by the CPU 81 into a control signal, and transmits the control signal to a device to be controlled.

The communication device 85 is capable of communicating with a host device and other devices (not shown). The host device is an information processing apparatus such as a personal computer or a smartphone operated by a user.

For example, the CPU 81 receives a printing job from the host device via the communication device 85. The image forming portion 4 forms an image specified by the printing job on the sheet 9.

The CPU 81 includes a plurality of processing modules that are achieved by executing the computer programs. The plurality of processing modules include a main control portion 8*a* and a printing control portion 8*b*.

The main control portion 8*a* executes control to start various types of processes in response to processing requests input via the operation device 801 or the communication device 85, and controls the display device 802, and the like.

The printing control portion 8*b* controls the sheet conveying device 3 and the image forming portion 4. That is, the printing process 8*b* controls the conveying of the sheet 9 by the sheet conveying device 3, and causes the image forming portion 4 to execute the printing process in synchronization with the conveying of the sheet 9.

Figure 3:
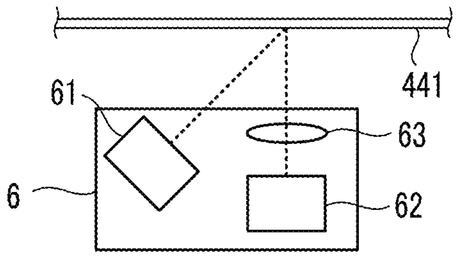
FIG. 3 is a diagram showing a configuration of a diffuse reflection light detection unit in an image forming apparatus according to an embodiment.

The image forming apparatus 10 further includes a diffuse reflection light detection portion 6 (see FIGS. 1 and 3). The diffuse reflection light detection portion 6 irradiates the surface of the intermediate transfer belt 441 with light and detects the amount of diffuse reflection light reflected by the surface of the intermediate transfer belt 441.

The diffuse reflection light detection portion 6 includes a light emitting element 61 and a light receiving element 62 (see FIG. 3). In the present embodiment, the diffuse reflection light detection portion 6 further includes a lens 63.

The light emitting element 61 irradiates the surface of the intermediate transfer belt 441 with light. For example, the light emitting element 61 is an LED, or the like. The light receiving element 62 detects the amount of the diffuse reflection light reflected by the surface of the intermediate transfer belt 441. The light receiving element 62 is a photoelectric conversion element that converts energy of the diffuse reflection light into an electrical signal. The lens 63 collects the diffuse reflection light onto the light receiving element 62.

In the present embodiment, the printing control portion 8*b* executes an image formation timing adjustment process that will be described later (see FIG. 5). The image formation timing adjustment process is a color slippage adjustment process for adjusting a positional shift of toner images of a plurality of development colors on the surface of intermediate transfer belt 441.

Figure 4:
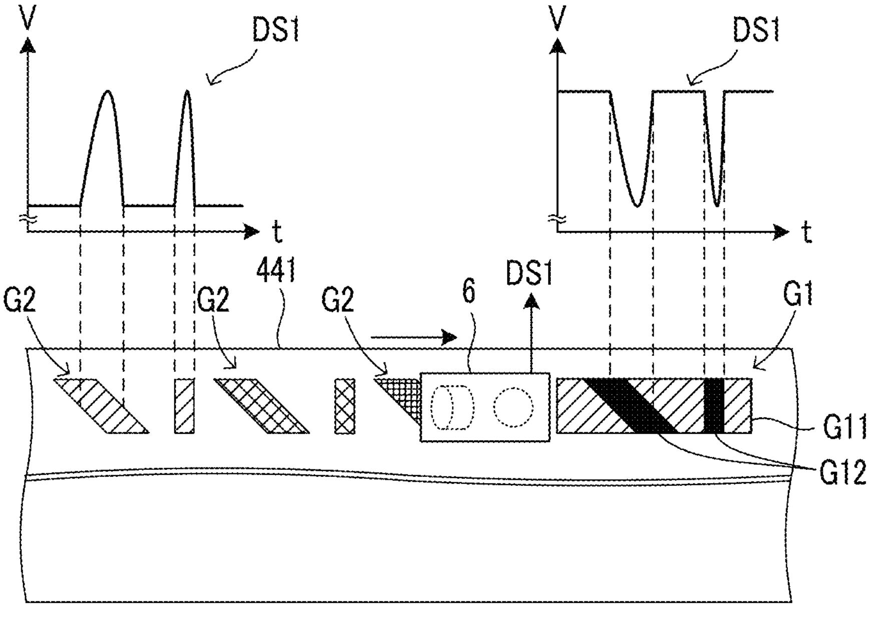
FIG. 4 is a diagram showing an example of a test image formed by an image forming apparatus according to an embodiment.

In the image formation timing adjustment process, the printing control portion 8*b* causes the image forming portion 4 to execute a process of forming a plurality of test images G1, G2 on the surface of the intermediate transfer belt 441 using toners of a plurality of development colors (see FIG. 4).

Figure 5:
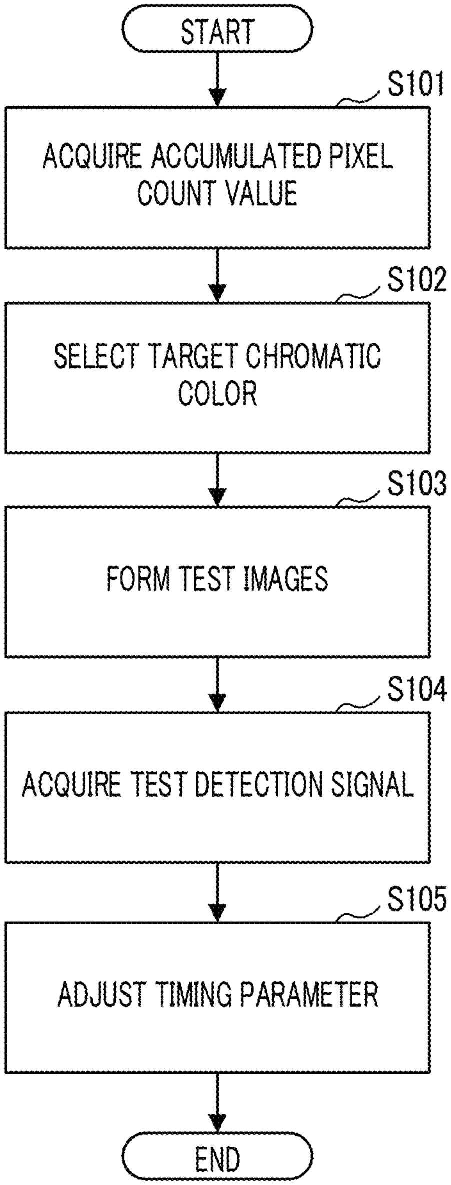
FIG. 5 is a flowchart showing an example of a procedure for an image formation timing adjustment process in an image forming apparatus according to an embodiment.

Furthermore, the printing control portion unit 8*b* adjusts a timing parameter PT1 in accordance with a detection result by the diffuse reflection light detection portion 6 for the plurality of test images G1, G2 (see FIGS. 2 and 5). The timing parameter PT1 is an adjustment parameter for adjusting timing of image formation of a plurality of development colors by the plurality of image forming units 40.

In the present embodiment, the timing parameter PT1 is stored in advance in the secondary storage device 83. When the printing control portion 8*b* adjusts the timing parameter PT1, the printing control portion 8*b* records the adjusted timing parameter PT1 in the secondary storage device 83.

The detection signal from the diffuse reflection light detection portion 6 may not accurately represent the position of a black test image due to a condition of the surface of the intermediate transfer belt 441, such as dirt or deterioration.

On the other hand, by forming a black test image G12 so as to be superimposed on a chromatic color background image G11, the detection signal from the diffuse reflection light detection portion 6 has the effect of accurately indicating the position of the black test image (see FIG. 4). In this case, it is desirable that the consumption of toner for forming the background image G11 does not adversely affect the ensuring of the remaining amount of toner for the printing process.

The image formation timing adjustment process includes a process for reducing influence that a process for forming a superimposed test image G1 in which the black test image G12 is superimposed on the chromatic color background image G11 has on ensuring the remaining amount of toner for the printing process.

In the present embodiment, the printing control portion 8*b* derives an accumulated pixel count value, which is an accumulated value of the number of pixels drawn for each of the plurality of chromatic color toners, every time the printing process is executed.

The printing control portion 8*b* records the derived accumulated pixel count value for each of the plurality of chromatic color toners in the secondary storage device 83. The accumulated pixel count value is referred to in the image formation timing adjustment process.

[Image Formation Timing Adjustment Process]

An example of the procedure of the image formation timing adjustment process will be described below with reference to the flowchart shown in FIG. 5. The image formation timing adjustment process is an example of a process that achieves an image formation adjustment method.

The printing control portion 8*b* executes the image formation timing adjustment process when an adjustment start event occurs.

For example, the adjustment start event is an event in which a request for an adjustment process is received via the operation device 801 or the communication device 85. In addition, the adjustment start event may be an event that the printing process has been executed a predetermined number of times.

In the following description, S101, S102, . . . represent identification codes of a plurality of steps in the image formation timing adjustment process. In the image formation timing adjustment process, first, the process of step S101 is executed.

<Step S101>

In step S101, the printing control portion 8*b* acquires the accumulated pixel count value for each of the plurality of chromatic color toners from the secondary storage device 83.

After executing the process of step S101, the printing control portion 8*b* executes the process of step S102.

<Step S102>

In step S102, the printing control portion 8*b* selects a target chromatic color, which is one of the plurality of chromatic colors, according to the accumulated pixel count value of each of the plurality of chromatic color toners.

For example, the printing control portion 8*b* selects one color corresponding to the smallest accumulated pixel count value among the plurality of chromatic colors as the target chromatic color.

The accumulated pixel count value for each of the plurality of chromatic color toners is an example of an index of a consumption status of the plurality of chromatic color toners.

After executing the process of step S102, the printing control portion 8*b* executes the process of step S103.

<Step S103>

In step S103, the printing control portion 8*b* causes the image forming portion 4 to execute a test image forming process. The test image forming process is a process of forming a superimposed test image G1 and a plurality of chromatic color test images G2 on the surface of the intermediate transfer belt 441, the superimposed test image G1 being made of the toner image of the specific chromatic color selected in step S102 as a background image G11.

That is, the superimposed test image G1 formed in step S103 is an image in which the black test image G12 is superimposed on the background image G11 of the target chromatic color.

In step S103 of the present embodiment, one superimposed test image G1 and three chromatic color test images G2, which are images of three chromatic colors, are formed on the surface of the intermediate transfer belt 441 (see FIG. 4).

The superimposed test image G1 and the plurality of chromatic color test images G2 are formed in an area passing through a position facing the diffuse reflection light detection portion 6 on the surface of the intermediate transfer belt 441 (see FIG. 4).

After executing the process of step S103, the printing control portion 8*b* executes the process of step S104.

<Step S104>

In step S104, the printing control portion 8*b* acquires a test detection signal DS1 from the diffuse reflection light detection portion 6 (see FIG. 4). The test detection signal DS1 is a detection signal of the amount of diffuse reflection light in each area of the superimposed test image G1 and the plurality of chromatic color test images G2 on the surface of the intermediate transfer belt 441.

After executing the process of step S104, the printing control portion 8*b* executes the process of step S105.

<Step S105>

In step S105, the printing control portion 8*b* adjusts the timing parameter PT1 based on the test detection signal DS1 obtained in step S104.

That is, the printing control portion 8*b* adjusts the timing of image formation of a plurality of colors by the image forming portion 4 based on the test detection signal DS1 obtained in step S104.

As shown in FIG. 4, in the test detection signal DS1, there is a large difference between a level corresponding to the reflected light in the black test image G12 or each of the plurality of chromatic color test images G2 and a level corresponding to the reflected light in the areas surrounding the black test image G12 or each of the plurality of chromatic color test images G2.

More specifically, in the test detection signal DS1, the level corresponding to the reflected light from the black test image G12 is smaller than the level corresponding to the reflected light from the background image G11 of the specific color. On the other hand, in the test detection signal DS1, the level corresponding to the reflected light from each of the chromatic color test images G2 is greater than the level corresponding to the reflected light from the surface of the intermediate transfer belt 441.

The printing control portion 8*b* determines the distance between the black test image G12 and each of the plurality of chromatic color test images G2 in the movement direction of the intermediate transfer belt 441 by comparing the level of the test detection signal DS1 with a reference level previously set for each of the development colors.

Furthermore, the printing control portion 8*b* adjusts the timing parameter PT1 in accordance with the difference between the distance between the black test image G12 and each of the plurality of chromatic color test images G2, which is specified based on the test detection signal DS1, and a predetermined reference distance.

In step S105, the printing control portion 8*b* records the adjusted timing parameter PT1 in the secondary storage device 83.

After executing the process of step S105, the printing control portion 8*b* ends the image formation timing adjustment process.

In the printing process after the process of step S105 is executed, the printing control portion 8*b* controls the timing for forming the toner images of the plurality of development colors by the image forming unit 4 based on the adjusted timing parameter PT1.

As described above, the target chromatic color to be adopted as the color of the background image G11 is selected according to the accumulated pixel count value for each of the plurality of chromatic color toners (step S102).

For example, as the target chromatic color, it is possible to select from among the plurality of chromatic color toners a toner color that is consumed in a relatively small amount. Thus, it possible to avoid a situation in which only a specific chromatic color toner is significantly consumed due to forming the superimposed test image G1.

By adopting the present embodiment, it is possible to reduce the effect that the formation of the superimposed test image G1 has on ensuring the remaining amount of toner for the printing process.

First Modification

Figure 6:
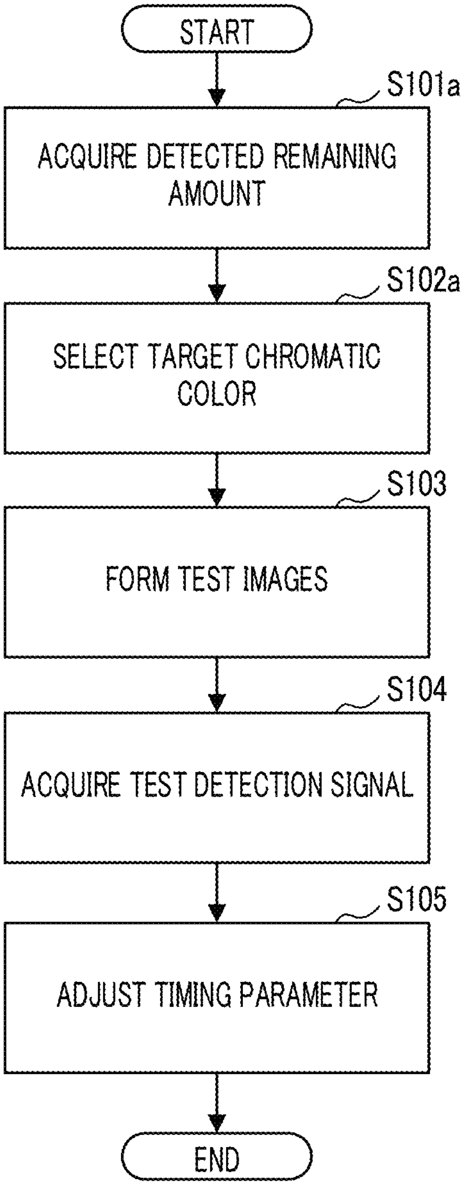
FIG. 6 is a flowchart showing a procedure of a first modification of an image formation timing adjustment process.

Next, a first modification of the image formation timing adjustment process will be described with reference to the flowchart shown in FIG. 6.

Hereinafter, the image formation timing adjustment process according to this modification will be described in terms of differences from the image formation timing adjustment process shown in FIG. 5.

In this modification, the image formation timing adjustment process is executed by a procedure in which steps S101 and S102 in the procedure shown in FIG. 5 are replaced with steps S101*a* and S102*a*.

<Step S101*a*>

In step S101*a*, the printing control portion 8*b* acquires the remaining amounts of toner of each of the plurality of chromatic colors detected by the remaining amount detection portion 53.

After executing the process of step S101*a*, the printing control portion 8*b* executes the process of step S102*a*.

<Step S102*a*>

In step S102*a*, the printing control portion 8*b* selects the target chromatic color from the plurality of chromatic colors according to the detected remaining amount of toner for each of the plurality of chromatic colors.

For example, the printing control portion 8*b* selects one color from among the plurality of chromatic colors that corresponds to the largest detected remaining amount as the target chromatic color.

The detected remaining amounts of the plurality of chromatic color toners are an example of an index of a consumption status of the plurality of chromatic color toners.

After executing the process of step S102*a*, the printing control portion 8*b* executes the process of step S103.

When this modification is adopted, the same effects as those obtained when the image formation timing adjustment process shown in FIG. 5 is adopted can be obtained.

Second Modification

Figure 7:
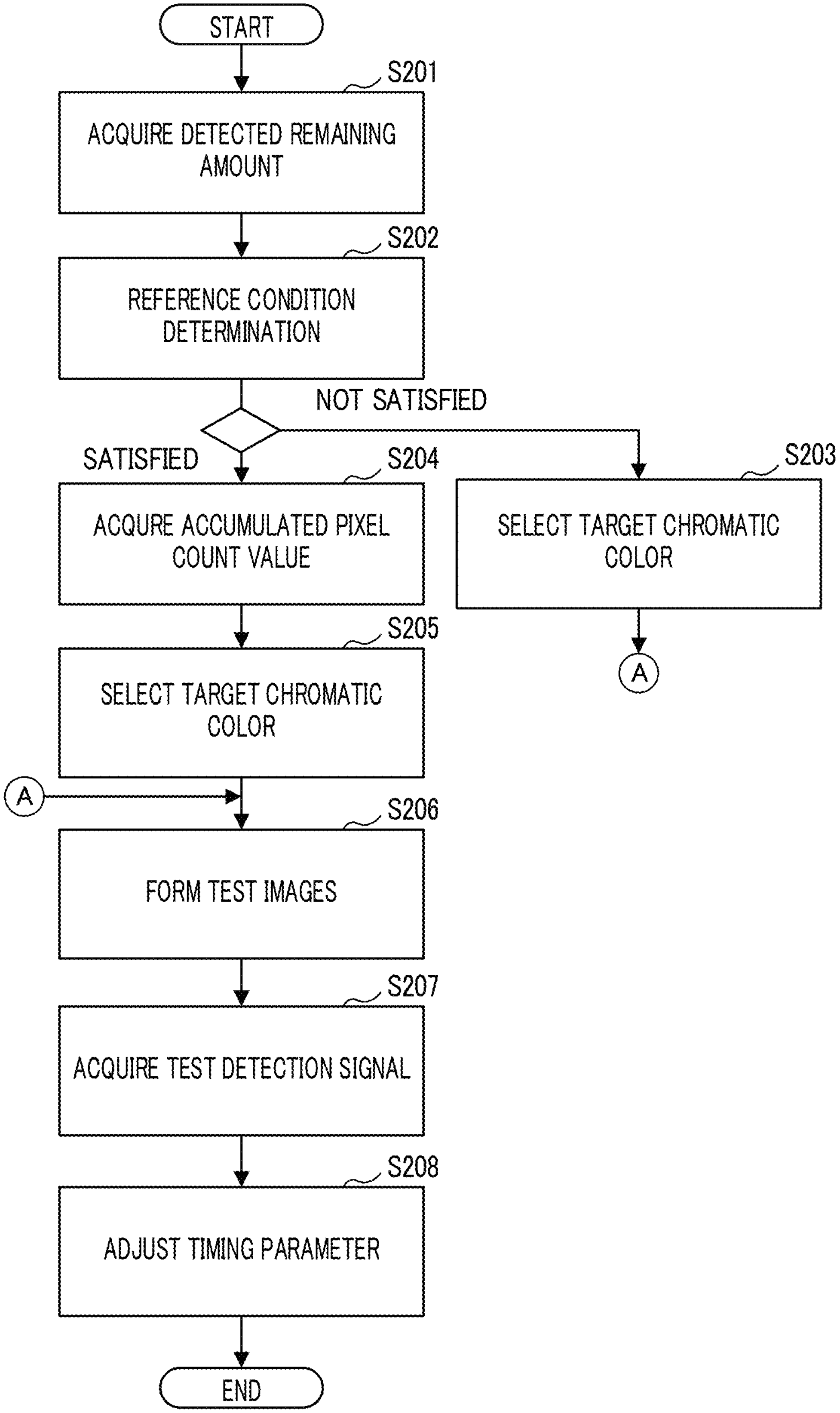
FIG. 7 is a flowchart showing a procedure of a second modification of an image formation timing adjustment process.

Next, a second modification of the image formation timing adjustment process will be described with reference to the flowchart shown in FIG. 7.

Hereinafter, the image formation timing adjustment process according to this modification will be described in terms of differences from the image formation timing adjustment process shown in FIG. 5.

In the following description, S201, S202, . . . represent identification codes of a plurality of steps in the image formation timing adjustment process according to this modification. In the image formation timing adjustment process according to this modification, first, the process of step S201 is executed.

In the present modification, the image formation timing adjustment process is executed by a procedure in which steps S101 and S102 in the procedure shown in FIG. 5 are replaced with steps S201 to S205.

The processes in steps S206 to S208 in the image formation timing adjustment process according to the present modification are the same as the processes in steps S103 to S105 shown in FIG. 5.

<Step S201>

In step S201, the printing control portion 8*b* acquires the detected remaining amounts detected by the remaining amount detection portion 53 for the toners of a plurality of chromatic colors. The process of step S201 is the same as the process of step S101*a*.

After executing the process of step S201, the printing control portion 8*b* executes the process of step S202.

<Step S202>

In step S202, the printing control portion 8*b* determines whether or not the detected remaining amounts of the plurality of chromatic color toners satisfy a reference condition.

For example, the reference condition is a condition that all of the detected remaining amounts of the plurality of chromatic color toners do not fall below the preset reference remaining amount.

The printing control portion 8*b* executes the process of step S203 when it is determined that the detected remaining amount does not satisfy the reference condition. On the other hand the printing control portion 8*b* executes the process of step S204 when it is determined that the detected remaining amount satisfies the reference condition.

<Step S203>

In step S203, the printing control portion 8*b* selects the target chromatic color from the plurality of chromatic colors according to the detected remaining amount of toner for each of the plurality of chromatic colors. The process of step S203 is the same as the process of step S102*a* (see FIG. 6).

For example, the printing control portion 8*b* selects one color from among the plurality of chromatic colors that corresponds to the largest detected remaining amount as the target chromatic color.

After executing the process of step S203, the printing control portion 8*b* executes the processes starting from step S206.

<Step S204>

In step S204, the printing control portion 8*b* acquires the accumulated pixel count value for each of the plurality of chromatic color toners from the secondary storage device 83. The process of step S204 is the same as the process of step S101.

After executing the process of step S204, the printing control portion 8*b* executes the process of step S205.

<Step S205>

In step S205, the printing control portion 8*b* selects a target chromatic color, which is one of the plurality of chromatic colors, according to the accumulated pixel count value of each of the plurality of chromatic color toners. The process of step S205 is the same as the process of step S102.

For example, the printing control portion 8*b* selects one color corresponding to the smallest accumulated pixel count value among the plurality of chromatic colors as the target chromatic color.

After executing the process of step S205, the printing control portion 8*b* executes the process of step S206.

<Steps S206 to S208>

In steps S206 to S208, the printing control portion 8*b* executes the same processes as those in steps S103 to S105 shown in FIG. 5.

When this modification is adopted, the same effects as those obtained when the image formation timing adjustment process shown in FIG. 5 is adopted can be obtained.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image formation adjustment method that adjusts an image forming apparatus, the image forming apparatus comprising:

a developing agent supply portion configured to supply black developing agent and developing agents for a plurality of chromatic colors;

an image forming portion configured to form an image of the black developing agent and the developing agents for the plurality of chromatic colors supplied from the developing agent supply portion on a surface of a transfer medium; and a diffuse reflection light detection portion configured to irradiate a surface of the transfer medium with light and detect an amount of diffuse reflection light reflected by the surface of the transfer medium; the image formation adjustment method comprising:

a control device selecting one of the plurality of chromatic colors as a target chromatic color according to a consumption status of the developing agents of the plurality of chromatic colors;

the control device causing the image forming portion to execute a process of forming, on the surface of the transfer medium, a plurality of chromatic color test images that are images of the plurality of chromatic colors, and a superimposed test image in which a black test image is superimposed on a background image of the target chromatic color;

the control device acquiring from the diffuse reflection light detection portion a test detection signal that is a detection signal of the amount of diffuse reflection light in each of areas of the plurality of chromatic color test images and the superimposed test image on the surface of the transfer medium; and the control device adjusting timing of image formation of the plurality of colors by the image forming portion based on the test detection signal.

2. The image formation adjustment method according to claim 1 further comprising in a case where the image forming apparatus comprises a remaining amount detection portion that detects a remaining amount of developing agent of each color in the developing agent supply portion, the control device selecting the target chromatic color in accordance with the remaining amounts of the developing agent of the plurality of chromatic colors detected by the remaining amount detection portion.

3. The image formation adjustment method according to claim 1 further comprising the control device deriving an accumulated value of a number of pixels to be drawn for each of the developing agents of the plurality of chromatic colors; and the control device selecting the target chromatic color in accordance with the accumulated value of the number of pixels to be drawn for each of the developing agents of the plurality of chromatic colors.

4. The image formation adjustment method according to claim 1 further comprising in a case where the image forming apparatus comprises a remaining amount detection portion that detects a remaining amount of developing agent of each color in the developing agent supply portion, the control device deriving an accumulated value of a number of pixels to be drawn for each of the developing agents of the plurality of chromatic colors; and in a case where the remaining amount detected by the remaining amount detection portion for the developing agents of the plurality of chromatic colors satisfies a reference condition, the control device selecting the target chromatic color in accordance with the accumulated value of the number of pixels to be drawn for each of the developing agents of the plurality of chromatic colors; and in a case where the remaining amount detected by the remaining amount detection portion for the developing agents of the plurality of chromatic colors does not satisfy the reference condition, the control device selecting the target chromatic color in accordance with a detection result of the remaining amount of the developing agents of the plurality of chromatic colors by the remaining amount detection portion.

5. An image forming apparatus comprising:

a developing agent supply portion configured to supply black developing agent and developing agents for a plurality of chromatic colors;

an image forming portion configured to form an image of the black developing agent and the developing agents for the plurality of chromatic colors supplied from the developing agent supply portion on a surface of a transfer medium;

a diffuse reflection light detection portion configured to irradiate a surface of the transfer medium with light and detect an amount of diffuse reflection light reflected by the surface of the transfer medium; and a control device configured to achieve the image formation adjustment method according to claim 1.

* * * * *